United States Patent [19]

Abend

[11] Patent Number: 5,710,215
[45] Date of Patent: Jan. 20, 1998

[54] METHOD AND MATERIAL MIXTURE FOR MANUFACTURE OF REACTIVE HOTMELTS

[75] Inventor: Thomas P. Abend, St.Gallen, Switzerland

[73] Assignee: Ebnother AG, Sempach-Station, Switzerland

[21] Appl. No.: 733,196

[22] Filed: Oct. 17, 1996

Related U.S. Application Data

[63] Continuation of Ser. No. 185,807, Jan. 28, 1994, abandoned.

[30] Foreign Application Priority Data

Jun. 15, 1992 [CH] Switzerland ............................... 1883/92

[51] Int. Cl.$^6$ ................................................. C08L 75/04
[52] U.S. Cl. .................... 525/124; 427/398.1; 428/412; 428/419; 428/423.1; 428/474.4; 428/500
[58] Field of Search ...................... 525/457, 440, 525/424, 395, 453, 399, 124; 427/398.1; 428/480, 474.4, 423.1, 419, 412, 500

[56] References Cited

U.S. PATENT DOCUMENTS 5,143,987   9/1992   Hänsel et al. ........................... 525/458

FOREIGN PATENT DOCUMENTS

| 0 153 579 | 1/1986 | European Pat. Off. . |
| 0 431 413 | 6/1991 | European Pat. Off. . |

*Primary Examiner*—Ana Woodward
*Attorney, Agent, or Firm*—Shoemaker and Mattare, Ltd.

[57] ABSTRACT

The invention proposes the following method of producing reactive melts which are especially useful as hotmelt adhesives:

a) suitable meltable hydroxy functional or amino functional polymers or polymer mixes (A) which become liquid at temperatures above 40° C. are inhomogenously mixed with b) powdered, solid, surface desactivated polyisocyanates (B) or a suspension of such polyisocyanates (B) in a low volatility carrier fluid, c) in approximately stoichiometric proportions at a temperature of at least 40° C. in a static mixer so that the resultant mixture of substances exhibits partial areas in which the ratio (1) of polymer (A) to (2) solid isocyanate (B) and desactivating agent (C) is different from the average ratio of these substances or mixtures thereof within the entire mix, d) the inhomogenous mixture is extracted in a form suitable for the intended use and solidified by cooling to below the mixture's softening point.

These preformed or possibly nonformed solid reactive melts are able to be stored at room temperature and retain their latent thermoreactivity.

15 Claims, 2 Drawing Sheets

METHOD AND MATERIAL MIXTURE FOR MANUFACTURE OF REACTIVE HOTMELTS

This application is a continuation of application Ser. No. 08/185 807 filed Jan. 28, 1994 now abandoned.

BACKGROUND OF THE INVENTION

The use of hotmelts for solvent free adhering, sealing and coating of solid or flexible materials is nowadays state of the art and is, for ecological reasons, preferred. In accordance with requirements, various thermoplastic polymers are nowadays used in the formulations, for example, amongst others, polyethylenes, copolymers of ethylene with vinyl acetate, copolymers of ethylene with acrylic esters or methacrylic esters, polyacrylate or polymethacrylate, polymers or copolymers of the alpha olefins, copolymers of styrene with isoprene or butadiene, polyamides and copolyamides, polyester or copolyester, thermoplastic polyurethane and epoxy resins.

A problem which still remains unsolved is the thermoplasticity of the hotmelts or hotmelt adhesives near the softening point and at temperatures above the softening point, as well as the resistance of the adhesion to solvents. Near the softening point, the resistance to thermal deformation of the bond reduces greatly, and when the melting point is exceeded, the hotmelt adhesives lose there strength, which can lead to failure of the adhesive bond.

Hotmelt powders or films for textile applications may be mentioned as an example: these should, at the lowest possible application temperatures, result in high bond strength (shortening of application time, elimination of damage to the textile fibre, elimination of bleeding or "off-setting"); the bond shall afterwards, however, withstand the high temperatures associated with subsequent handling and treatment processes (pressing, ironing, shaping, drying on shaped forms or mannekins). The adhesive bonds are here subjected to temperatures which are of the same intensity or many times greater than the softening point of the adhesive or the previously applied bonding temperature. The dimensional stability of bonded textile items is threatened by these treatments.

The same undesirable effects, namely, failure of the adhesive bond, will occur if the hotmelt adhesive is subjected to solvents as used in dry cleaning, or excessive washing temperatures.

There has been no lack of experiments concerning the reduction or elimination of thermoplasticity and solubility of the adhesive bonds of hotmelts and hotmelt adhesives. Thus, moisture reactive isocyanate or silane groups have been introduced into the polymer. Crosslinked, thermoset polymers will ensue as a result of the influence of moisture or water after application of the molten adhesive. A disadvantage is that these systems must be stored under exclusion of moisture up to their point of application. In hot curing systems, crosslinked, thermoset polymers will also arise from functional polymers with heat reactive crosslinkers, with peroxides, of hydroxy functional or amino functional polymers with blocked isocyanates, and solid epoxy resins with dicyandiamides etc.. A disadvantage with the outlined reactive hotmelt adhesives is that the crosslinking temperature exceeds 130° to 140° C. Reaction times in practice require still higher temperatures, which forbids the use of various, heat sensitive substrates.

The composition of nonreactive, of moisture reactive or heat reactive hotmelts, their advantages and their disadvantages, are known to the expert and are described in the technical literature and patent specifications, for example in: "Schmelzklebstoffe", Vol. 4a (1985), 4b (1986), 4c (1987), "Schmelzhaftklebstoffe" Vol. 6a (1990) of the "Klebstoff-Monographien" by R. Jordan, Publisher: Hinterwaldner Verlag (Munich),

SUMMARY OF THE INVENTION

The purpose of the invention is to avoid the disadvantages as they are known, and in particular therefore to produce hotmelts which:

are able to be preformed or applied to the surface of substrates, subsequently solidify, through cooling, afterwards, after any desired period, can be remelted on the substrate through the application of heat, if necessary joined, subsequently, through increasing the temperature further, can be irreversibly crosslinked.

Surprisingly, a method, which does not possess the disadvantages known up to now and considerably extends the area of application of the hotmelts or melting adhesives, of manufacturing reactive hotmelts applied in bulk or preformed as well as a solid mixture of substances at room temperature, has been found.

According to the invention, the set task is solved in particular according to the independent patent claims. The invention can be realised in a particularly advantageous way if:

a) suitable, fusible thermoplastic polymers or polymer mixes A which convert into the liquid condition at temperatures above 40° C. and in particular above 55° C. and which carry groups reactive to isocyanates such as hydroxyl groups or amino groups, b) are mixed with powder form, solid, surface deactivated isocyanates B with at least two isocyanate groups or a suspension or dispersion of powder form, solid di- or polyisocyanates B which are surface treated with a deactivating agent C, in a high boiling carrier liquid, c) unhomogenously at a temperature of at least 40° C. in approximately stoichiometric proportions so that the resulting mixture of substances possesses partial areas in which the ratio of 1 Polymer A to 2 solid isocyanate B and deactivating agent C is different, namely is greater or lesser than the average ratio of these substances or mixtures of substances throughout the entire mixture of substances, d) the unhomogenous mixture is applied in a form appropriate to one of the intended applications and is allowed to solidify through cooling of the mixture below its softening point.

These preformed or, if necessary, nonformed, solid reactive hotmelts are shelf stable at room temperature and retain latent thermoreactivity. After any period of time, they can be made liquid again through heating of the multilayer of substrate and preapplied hotmelt or hotmelt adhesive, joined, and then irreversibly crosslinked through raising of the temperature above the "activation temperature". These hotmelts serve the purpose of bonding, sealing, laminating or coating of wood, plastics, metals, glass, textiles, synthetic non-wovens, cardboard, paper, films, foils and so forth.

Polymer reactive systems, carrying hydroxyl or amino groups, and deactivating, solid, isocyanates in powder form are known from patent specifications EP-062 780, EP-100 507, DE-32 30 757, DE-34 03 499, DE-34 03 500 as well as the technical literature, for example as contained in Blum, R.; Schupp, H., Prog. Org. Coat. 1990, 18(3), S. 275–288.

In the method described, a homogeneous mixture of a liquid polyol or polyamine and a solid isocyanate, with surface deactivated by amines, is produced which will not react at room temperatures. On attaining or exceeding the so-called "activation temperature", or reaction temperature, which lies above 55° C., preferably above 80° C., the reaction between solid isocyanates and functional groups of the polymer will commence, if necessary accelerated by catalysts. This reaction will lead to crosslinked, high molecular weight polyurethane or polyurea.

As an "activation temperature", that (minimum) temperature is denoted at which the viscosity of the hotmelt begins to increase through the reaction of the deactivated isocyanate with the hydroxyl, or the polymer which contains hydroxyl or amino groups, under formation of urethane or urea groups. This temperature can, through commencement of exothermal reactions between the named components, for example be ascertained by using thermoanalytical methods, for example DSC (Differential Scanning Calorimetry).

It has been suggested in, amongst others, DE-32 30 757, that solid polyols with a softening point in the region of 45 to 65° C. be mixed with the deactivated, solid isocyanates. After homogenising and degassing of the mixture, the melt is allowed to solidify, and then brought to a granulated condition through a suitable grinding process. At a suitable time, the reactive blend, stable when stored at room temperature, can be transferred to a mold heated to approximately 70° to 100° C. After melting, the viscous melt will solidify at 100° to 120° C., through the impact of heat.

Instructions concerning the continuous method, presented here in accordance with the invention, for creation of an inhomogeneous, latent reactive hotmelt and its use for achieving a permanent and heat resistant bond with one or more substrate surfaces, do not arise out of this patent.

In the following, the components will be indicated as follows:

Polymer A, for thermoplastic polymer with functional, isocyanate reactive groups, Isocyanate B, for solid di- or polyisocyanate, Deactivating agent C, to include bound deactivating agent C' and unbound deactivating C", which together form the deactivating potential, Crosslinking or chain extension components D, for solid or liquid isocyanate reactive compounds with molecular weight up to 500, Additives E, for isocyanate nonreactive organic or inorganic compounds.

As polymers A, solid at room temperature, with melting or softening point at 40° C. or higher, the following are suitable for execution of the method according to the invention:

Hydroxy functional or amino functional, aliphatic or aromatic polyester, polycaprolactone, polycarbonate, polyacetale, polyacrylate, polyamide, polyurethane, polyether, polythioether, Copolymers of styrene or alpha-methylstyrene with allylalcohol, low molecular weight copolymers of ethylene or alpha-olefins with hydroxyethyl- or hydroxypropylacrylates or -methacrylates, and other monomers without the hydroxy-functions such as ethyl-acrylate, butylacrylate, ethylmethacrylate, butylmethacrylate, graft polymers as a result of graft reactions of hydroxyethyl- or hydroxypropyl-acrylate, -methacrylate, allylalcohol, aminoalkyl- and mercaptoalkyl-alkoxysilane on polymers of ethylene, alpha-olefins or copolymers of ethylene, alpha-olefins, or copolymers of ethylene, alpha-olefins with vinyl acetate, ethyl-, butyl-acrylate or -methacrylate, hydrolytic products of copolymers of ethylene with vinylacetate, hydroxy containing derivatives of fatty acids, liquid above 40° C. and solid below this temperature, hydroxy functional or amino functional prepolymers obtained through the reaction of low or high molecular weight polyols or diamines with di- or polyisocyanates.

Blends of the previously mentioned polymers can also be used. The number of functional groups per molecule of the polymer shall lie, on average, between 1.5 and 6, preferably between 1.8 and 4, and the molecular weight in the area between 400 and 25'000.

The melting or softening point, respectively the solidification point of the polymers shall lie above 40° C., preferably above 55° C. The uppermost limit for the melting or softening point of the polymer is the "activation or reaction temperature" of the surface deactivated isocyanate.

The proportion of the polymer components A shall with advantage amount to at least 40% weight of the total binder.

Low molecular weight aliphatic or aromatic, hydroxy functional or amino functional crosslinking or chain extension agents D, with a molecular weight of 62 to 500 and a functionality of between 2 and 4, can be used in the blend. A condition is that they are either solid at temperatures above 40° C. or do not lower the softening point of the polymer in the hotmelt below 40° C.

Low molecular weight polyols or polyamines which can be used in the hotmelt as a crosslinking and chain extension agent or for the production of the hydroxy functional or amino functional prepolymers are, for example: ethanediol, propanediol, propyleneglycol, dipropylenglycol, butandiol, hexandiol, decanediol, neopentylglycol, 1,4cyclohexane-dimethanol, hydroquinone-di(2hydroxyethyl)ether, 2,2, 4trimethyll, 3-pentanediol, bisphenol Aethoxylate, bisphenol Apropoxylate, trishydroxyethylisocyanurate, pentaerythrite, N,Nbis(2hydroxypropyl)aniline, triethanolamine, N,N'bis(hydroxyethyl)piperazine, 3,5diethyl2,4 and 2,6diaminotoluene, 2,4' and 4,4' diphenylmethandiamine, 3,3'dimethyl4, 4'diaminodiphenylmethane, 4,4' diaminodiphenylether or sulphide, 4,4 'diaminodicyclohexylmethane.

As organic isocyanates B, mainly the aliphatic, cycloaliphatic and aromatic, solid at room temperature, poly functional isocyanates are considered. In so far as the polyfunctional isocyanates are liquid at room temperature, they are converted by chemical reaction to polyisocyanates which are solid at room temperature. The following may be named as examples of reaction products: di or polyisocyanates containing the following groups: ester, urea, biuret, allophanate-, carbodiimide-, uretdione-, urethane-, or isocyanurate groups.

The solid isocyanates shall be insoluble in the functional polymer or in the high boiling solvent of the suspension at temperatures below the activation temperature.

The following have in particular proved themselves for the intended purpose:

dimerized 2,4 and 2,6-diisocyanatotoluene or 2,4' and 4,4' diisocyanatodiphenylmethane, possessing uretdione groups.

1,5naphthalindiisocyanate, bitoluylendiisocyanate or 3,3'dimethyl4,4' diphenyldiisocyanate.

modified di or polyisocyanates containing urethane, urea, uretdion, isocyanurate groups on the basis of 1,6hexanediisocyanate, lisocyanato3,3, 5trimethyl5isocyanatomethylcyclohexa ne, dimethylxylylen and tetramethylxylylendiisocyanate, 2,4', 4,4'diisocyanatodiphenylmethane, 2,4 and 2,6-diisocyanato-toluene.

4,4' diisocyanato3,3'dimethyl-diphenylurea.

Reaction products of diisocyanates with trimethylolpropane or other short chain polyols or polyamines.

Mixtures of solid, powder form isocyanate can also be used.

In order to prevent uncontrolled and spontaneous reaction between the powder form, solid isocyanate and the functional polymers, polyols, polyamines on uniting with the liquid polymer, or afterwards during storage and processing of the hotmelt adhesive, the powder form, solid isocyanates are surface deactivated.

The deactivating agent is so selected that it is bonded to the surface of the isocyanate particles through chemical reaction, and in this way gives rise to separation of phases by means of an inert layer between the polyisocyanate particles and the other reactive components, namely the hydroxy functional and amino functional polymers and low molecular weight functional crosslinkers or chain extension agents.

For the deactivating of the isocyanate groups of the solid isocyanate, 0,1 to 25, in particular 0,2 to 12 equivalent percent of the available isocyanate groups of the solid isocyanate are reacted with the deactivating agent C. In order to obtain stable hotmelts, an excess of deactivating agent is always to be used when working. This "unbound" deactivating agent C", together with the surface "bound" or "reacted" deactivating agent C', forms the "deactivation potential". The unbound deactivating agent C" can differ from the bound deactivating agent C' in that the surface deactivation takes place in two stages, commencing with deactivating agent C'. The ratio of unbound deactivating agent C" to bound deactivating agent C' can amount to 0.1 to 10.

The optimal concentration of deactivator must be experimentally ascertained, corresponding to the intended use of the reactive hotmelt and corresponding to the particle size of the solid isocyanate. The mean particle size will dictate the required concentration of deactivator, particles with smaller particle size and correspondingly more surface area requiring more desactivating amine.

The quoted literature (Blum, R.; Schupp, H., Prog. Org. Coat. 1990, 18(3), 275 288) and the above quoted patents provide instructions as to the determination of the optimal concentration of deactivator.

The solid polyisocyanates B are deactivated, preferably through reaction with primary and secondary aliphatic amines, di or polyamines, derivatives of hydrazine, amidine and guanidine. Further deactivating agents are listed in the above mentioned patent specifications.

The following have been found sound: ethylenediamine, 1,3-propylenediamine, diethylene-triamine, triethylenetetramine, 2,5dimethylpiperazine, 3,3'dimethy4,4'diaminodicyclohexylmethane, methylnonanediamine, isophorondiamine, 4,4'diaminodicyclohexylmethane, diamino and triaminopolypropylenether (Jeffamine$^R$, Texaco Chem. Co.), polyamidoamine (Euretek$^R$, Shering AG, Berlin), aminoalkylalkoxysilane and mixes of mono, di and polyamine.

The solid, surface deactivated isocyanates are sensitive to mechanical stress arising from high shear action. Through excessive shear, mainly in metering and supply pumps, in the piping, in the static mixers or under the action of doctor blades, the inert layer separating the reactive phases (comprised mainly of polyureas) can be destroyed, exposing the surface of the solid isocyanate. Premature reaction will be the result. Through the presence of the deactivating agent C", the system is "selfhealing": as long as the deactivating agent C" is present in the system, the exposed isocyanate surface will react rapidly and preferentially with the deactivating amines, with spontaneous formation of a new inert polyurea layer.

As a deactivating agent C", low molecular weight amine or polyamide, with molecular weights up to 450, has been particularly proven in that these diffuse more rapidly than the higher molecular weight polyamine onto the damaged surface of the solid isocyanate.

The deactivating reaction can also take place in processing of a master batch, in an inert, light solvent. The solvent can be removed after completion of the deactivating reaction, if necessary after introduction of a second deactivating amine which acts as an unbound desactivating agent C".

Within the entire mixture of substances, the relationship of the isocyanate groups of reactive, solid isocyanate B to the sum of amino and/or hydroxyl groups of the polymer A, of the deactivating agent C, and of the lower molecular weight chain extension agent or crosslinking agent D amounts to 0,5 to 2, preferably 0,8 to 1,5 (data in equivalents)

Liquid phase for the preparation of the suspensions of solid isocyanate B can be high boiling solvents, liquid or low melting plasticizers or low melting point, low molecular weight, if necessary functional polymers or resins. The mentioned low molecular weight hydroxy functional chain extension agents and crosslinking agents D, which are compatible with the polymers A, are also particularly suitable. In the case of the deactivating reaction, the solid isocyanates react preferentially with the simultaneously present deactivating amines.

The use of low molecular weight and low viscosity solvents or plasticizers for manufacture of the suspension of solid deactivated isocyanate can be advantageous: During metering and pumping, within the piping and during mixing with the polyol components in the static mixer, the viscosity of the suspension and, with that, the associated shear stress to the inert surface of the deactivated isocyanate, is small.

The isocyanate functional groups of the components, which if necessary serve to form the preparation of the suspension or dispersion of the solid, deactivated isocyanate, must likewise be considered when calculating the NCO/NH+OH ratios.

If necessary, the following, further additives E can be introduced:

the urethane catalysts known to the expert in the art, mainly based on organometals. Tertiary amines can become volatile during open storage of the reactive hotmelts or react with the carbon dioxide in the air and so loose some of their effectiveness. Organometals for the intended purpose are organic tin (II), tin (IV), iron, lead, cobalt, bismuthantimon, zinc, and magnesium-compounds. Diazabicyclooctane (Dabco) can be used as amine catalysts, as well as diazabicycloundecene (DBU), mainly after partial or complete neutralisation with organic acids or phenols. The catalysts are employed as a rule in an amount between 0.001 and 3 percent weight, related to the total composition.

Polymers without isocyanate functional groups, small amounts of solvent, plasticizer, diluents and resins, pigments, dyestuffs, fillers, pyrogenic silicic acid, carbon black, short chopped fibers, metal in powder form, metallic oxides, ferrites, light and oxidation stabilisers, fungistatic or bacteriostatic agents, rheological agents, nonsag additives, surfactants, and adhesive additives. The use of such additives in hotmelts is state of the art.

DESCRIPTION OF THE PREFERRED EMBODIMENTS

Figure 1:
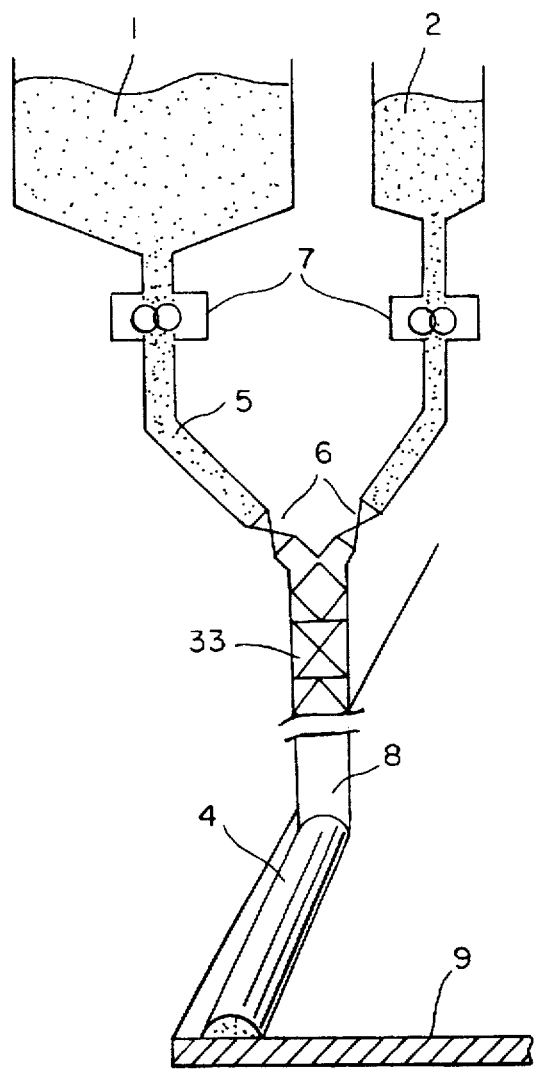
FIG. 1 is a diagram showing two components being mixed in accordance with the invention.

In an initial embodiment of the method according to the invention, as represented in FIG. 1, the controlled, nonhomogenous mixture of both the components according to the invention,

| | |
|---|---|
| 1 and | the polymers A |
| 2 | the suspension of the deactivated, solid isocyanate B in a carrier liquid 2, which still contains excessive deactivating agent C", | can take place in a completely or partially heated two component mixing machine with static mixer 3 as commonly used for processing 2component coatings, sealants and adhesives. These devices are state of the art, known to the expert in the art and commercially available.

Static mixers 3 for mixing of two or more components are nowadays, as an alternative to dynamic mixing heads, state of the art. For the intended purpose, mainly the static (tube) mixer from Sulzer AG (Winterthur, Switzerland), in which the mixing ensues radially and longitudinally within a system of interspaced and overlapping webs, and the Kenics$^R$ static mixer system (according to U.S. Pat. No. 3,286,992) or the comparable Statomix$^R$ static mixer system from MIXPAC Systems AG (Rotkreuz, Switzerland), with opposed, helical elements arranged in a tube which mix longitudinally, have proved their worth. An element comprises, for example, a lefthand spiralled helical baffle of a half turn. This is followed by an element with a righthand baffle of a half turn.

The static mixers also permit mixing of more than two partial flows, for example a third separate flow of a catalyst solution or a pigment dispersion.

According to this invention, the static mixers permit nonhomogenous mixing of the components and the formation of partial areas or zones in which use is not made of the number of mixing elements which would otherwise be necessary for complete homogenous mixing: homogenous shall mean here that the concentration of a soluble, compatible, mixable component in a partial area of 1 mm$^2$ does nor deviate by more than 2% from the average value within the entire mixture.

An extrudate 4, which is not completely homogenous, results at the end of the static mixer. This extrudate comprises layers or partial areas which are alternately either rich in polymers A, or rich in solid isocyanate B and desactivating amines C.

Through the excess of unbound deactivating agent C" in the isocyanate rich layers, premanufactured hotmelts are attained with excellent shelf stability.

It is known to the expert in the art that, for mixing with a static helical element mixer, 20 to 32 elements, preferably at least 24 elements, must be used, and with the tube mixer from the firm Sulzer at least 12 elements, in order to achieve a homogenous mixture, a condition being that the viscosity of the components must not vary by more than a factor of 100 to 1.

Processing, according to the invention, is such that 10 to 22, and preferably 12 to 18 elements, of a baffle mixer are used in the tube of a static mixer. At a constant flow speed, this number of elements corresponds approximately to 50 to 90% of the number of elements which would otherwise be necessary to create a homogenous, molecularly dispersed mixture, for example of the deactivating amines C" in the Polymer A. If other types of static mixers are used, likewise only 50 to 80% of the number of elements are used which would otherwise be necessary to create a homogenous mixture.

The nonhomogenous mixture can be made visible at the end of the static mixer by adding a dye or pigment to one of the components. The resulting partial areas will be visible through the different optical density of the components, and can be measured.

The thickness of the layers, or expansion of the partial areas, which are either rich in polymer A or rich in solid isocyanate B and deactivating amine C, preferably approximately corresponds to the mean particle size of the solid, deactivated isocyanate particles and shall not fundamentally exceed the maximum particle size. The optimal number of mixing elements in the static mixer must be ascertained by means of experiments, and is determined by the viscosity, the rheological characteristics of the components or the blend and the intended application of the hotmelts.

If blending is carried out with a "paucity" of mixing elements, an added advantage will be a low pressure drop the static mixer.

In the mixing device (FIG. 1), the static mixer 3, the piping 5, and metering devices 6 and pump 7 are heated, the temperature of the heated piping, metering devices, pumps and mixer being of necessity below the activation temperature of the isocyanate.

The resulting stream of the product 4, namely the liquid hotmelt, exits through dies 8 at the end of the static mixer 3, the cross section of the die determining the cross section of the solid, uncrosslinked hotmelt. The liquid hotmelt can be deposited onto the substrate, for example as a coating, if necessary one or double sided on a carrier or reinforcing material, as a bead, as a profile, in stripform and as a powder point coating, through selection of the die and the method of application. After exiting the die, the adhesive is cooled, either through ambient air, through the cooling effect of the item to which the adhesive is applied, or through a supply of cooled air, gas or inert liquids. Unsupported reactive hotmelts, for example in the form of a film, a bead, a net, a granulate or in various forms are obtained through application of the liquid, uncrosslinked adhesive onto a belt which supports a nonsticking surface or a surface provided with a releasing agent. After cooling of the adhesive, this can be separated from the carrier surface and immediately, or during application, be applied to the surface to be adhered, sealed or coated.

Reactive hotmelts in powder form are obtained through extruding the liquid mixture onto a conveyor belt with a nonstick surface and cooling it there to a temperature below its melting point. After solidification, the hotmelt adhesive can be released from the belt and in a known way, for example by means of cryogenic grinding, reduced to a granulate or a powder and if necessary passed through a sieve to produce the required fractions. The powders according to the invention serve as reactive hotmelts in powder form for textile fabrics, in accordance with known methods of application, for example scatter coating, powder point coating or paste point coating. They can, however, be used as reactive hotmelt powder for the adhesion of plastic film, veneer, paper, metal foil, sheet metal and similar, either with themselves or with carrier materials, and for coating purposes, such as powder coating, for example.

Figure 2:
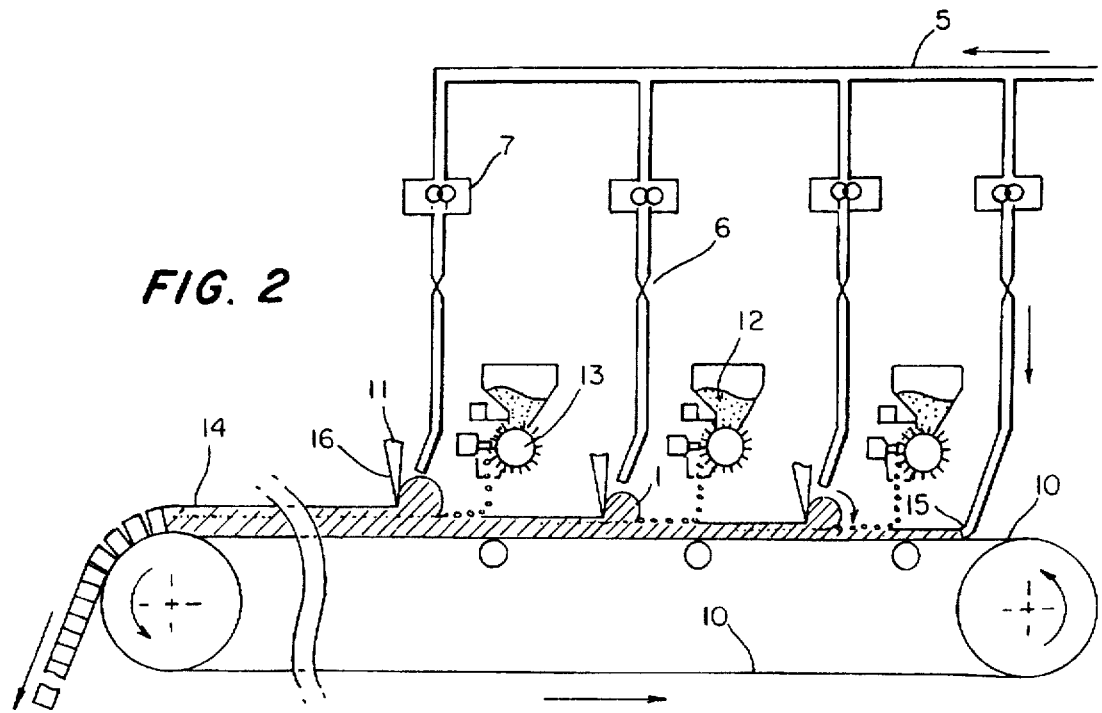
FIG. 2 is a view of another embodiment of the invention, showing a method of forming a multiple-layer coating on a belt.
Figure 3:
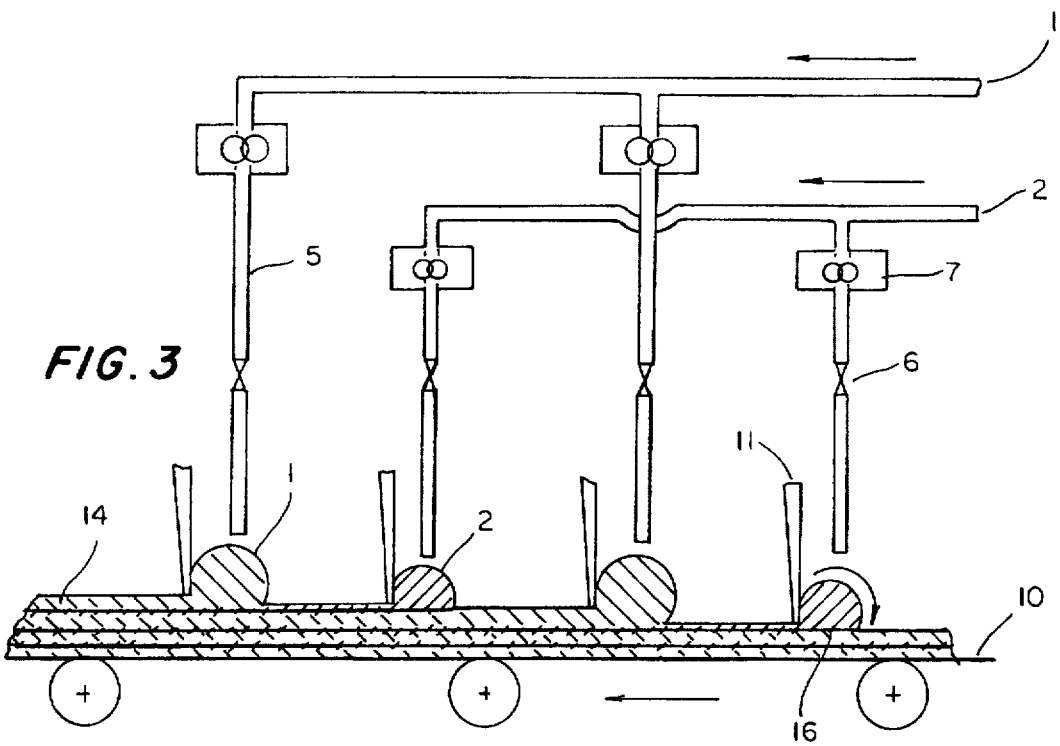
FIG. 3 is a view of a third embodiment in which the components are applied one atop the other in alternating layers from interleaved nozzles.

In another embodiment of the method according to the invention, as represented in FIGS. 2 and 3, a moveable belt 10 is used, primarily a metal belt with a nonsticking surface, which can be heated, and which moves at a constant speed beneath the "application heads" for the individual layers. The mixture according to the invention is created in such a way that a) the molten polymer A 1 is applied with a doctor blade 11 in a layer thickness of 3μ to 200μ onto a moveable conveyor belt coated with adhesive, b) the solid, surface deactivated isocyanate B, in powder form 12, is scattered by means of a scattering device 13, or as a suspension 2 of the deactivated powder in a carrier liquid with excess deactivating amine, indeed with said sprinkling device 13 or doctor blades 11, which can control and meter the weight or proportion of the applied isocyanate in relation to the weight of the polymer, c) the steps a) and b) are repeated for sufficiently long until the desired thicknesses of the multilayer coating 14, comprising polymer rich and isocyanate rich layers, is attained.

Alternatively, the liquid flows of
(a) Polymer A, and the
(b) suspension of solid, deactivated isocyanate B in a carrier liquid
are simultaneously extruded in a defined ratio through the separate openings of a multiple die.

The still liquid or pasty multilayer can be shaped, pressed, compressed or stretched prior to solidification.

d) The multilayer 14, whose thickness amounts to between 10μ and several millimeters, can be released from the carrier either in liquid form or after cooling, and subsequently reduced by a known method to a granulate or to a powder with a grain size of up to 500μ and if necessary passed through a sieve to produce the desired fractions. The multilayer can also be further processed in film, bead or strip form for adhesive purposes or as a coating material, if necessary being reinforced by a carrier material applied to the one side, or in the form of a reinforcement material held within the multilayer.

Slotted dies 15 or doctor blades 11, which can be heated, can serve as the "application head" or application device for layering of the polymer A and the suspension of the isocyanate B. The doctor blades 11 are able to be adjusted in such a way that a defined gap can be maintained in relation to the surface of the preceding layer. The liquid polymer A or the suspension B is metered by the pumps 7, fed to the slotted die 15 and extruded onto the strip. When using the doctor blades, the polymer A and the suspension of deactivated isocyanate B is fed via heated pumps and piping 5 in such a way that a rotating bead 16 arises in front of the doctor blade. The surface of the polymer of the previously applied layer must still be liquid or tacky when applying the subsequent layer (suspension of the solid isocyanate) or scattering of the solid isocyanate.

The adhesion of the various layers in this multilayer shall be the same or greater that the cohesion within the layers.

As mentioned, hotmelts according to the invention can be applied to a carrier or reinforcing material, if necessary applied single or double sided, as a sealant bead, a profile, in strips, as powder points, as a carrier free film, as a net, as sealant beads or as a powder onto the adhering, sealing or coating substrates. On reaching the melting or softening temperature of the polymer, they become liquid. In this condition, they can wet the surface of the substrates or the adhering surfaces. On reaching the activation temperature of the solid deactivated isocyanate, which should be higher than the melting or softening temperature of the polymers, they will irreversibly crosslink to high molecular weight, thermoset polyurethanes or polyureas.

The heat transfer into the system of hotmelts and/or substrate(s) can ensue by conventional means such as heated air, heated gases, through heat or infrared radiation, contact heat or the exploitation of the residual heat of the substrates, or inductively with microwaves, electrical heating, friction or ultrasonics.

For crosslinking by means of heat produced by induction, microwaves or electrical heating, it has been proven advantageous if a metallic filler, carbon black, graphite, metal oxides or ferrites are added to the hotmelt.

EXAMPLES

Materials used:

| Polymers | Softening Point °C. | Hydroxyl value | Equivalent g | Spec. weight |
|---|---|---|---|---|
| Polycaprolactone Capa 231 (a) | 55 | 37 | 1500 | 1,07 |
| Polycaprolactone Capa 240 (a) | 58 | 28 | 2000 | 1,07 |
| Dynacoll 7350 (b) | 65 | 30 | 1866 | 1,19 |

| Isocyanate | % NCO | Equivalent g | Melting point °C. | Functionality | |
|---|---|---|---|---|---|
| Isonate M 143 (c) | 29.4 | 143 | <15 | 2.1 | 2.2 |
| Desmodur TT (d) | 24.1 | 174 | >150 | 2.0 | 2.1 |
| Amine Laromin C 260 (e) | | 119.2 | <0 | 2.0 | |
| Catalyst UL29 (f) | Tin (IV)organic compound | | | | |
| Plasticizer | BBP Butylbenzylphthalate (g), liquid | | | | |

(a) Linear Polycaprolactone, Interox Chemicals Ltd.
(b) Linear Polyester, Hüls AG
(c) Diphenylmethanediisocyanate, The Dow Chemical Co.
(d) Toluenediisocyanate, "Dimeres TDI", Bayer AG, mean particle size 12μ
(e) 3,3' Dimethyl4.4'diamino-dicyclohexylmethane, BASF AG,
(f) Witco Chem., Corp.
(g) Bayer AG Example 1

Component 1

The hydroxy functional Polymer A was manufactured as follows:

| (1) | Dynacoll 7350 | 3732 g | (2 Equiv.) |
|---|---|---|---|
| (2) | Isonate 143 | 143 g | (1 Equiv.) |
| (3) | UL29solution, 10% in BBP 4 g was, during 12 hours at 80° C., converted to | | |
| (4) | Polymer A | 3879 g | (1 Equiv.) |

Component 2
Suspension of the solid, deactivated isocyanate

| (5) | Laromin C 260 | 6.6 g | (0.055 Equiv.) |
|---|---|---|---|
| (6) | Benzylbutylphthalate | 374.4 g | |
| (7) | Desmodur TT | 200.0 g | (1.15 Equiv.) |
| (8) | Total suspension B | 581.0 g | (1.095 Equiv.) |

Both the components were metered in a two component mixing unit at a mixing ratio of 100 parts/component A to 15 parts/component B by means of heated gear pumps at a temperature of 70° C. and fed in separate, heated piping to a thermally insulated static spiral element mixer (diameter 10 mm) from Mixpac AG, Rotkreuz, (Switzerland), which was equipped with 16 elements, namely with opposed spiral elements arranged within one tube. (Inside tube diamater 10 mm, length of one element 10 mm).

The continuously mixed hotmelt was applied as a bead to the surface of a right angled profile of glass reinforced plastic (UP). The hotmelt solidified as a result of cooling through the profile and the ambient air. The latent reactive hotmelt was capable of being stored for a period in excess of 4 weeks at room temperature, which means that after 4 weeks storage the hotmelt, at 70 ° C., was still meltable and exhibited a tacky surface.

The latent reactive hotmelt, after 7 days storage, was made liquid through heating at a temperature of 80° C. in an oven, and pressed against another UP profile. The temperature of the "sandwich" was increased to 115° C. Within 5 minutes the adhesive joint became firm, and was allowed to remain at this temperature for a further 30 minutes.

The adhesive joint was able to be separated at room temperature only through destruction of the joined "sandwich". The joint withstood temperatures of 140° C., undamaged.

Example 2

Component 1
The hydroxy functional polymer was manufactured as follows:

| (1) | Capa 240 | 4500 g | (2.25 Equiv.) |
|---|---|---|---|
| (2) | Isonate 143 | 179 g | (1.25 Equiv.) |
| (3) | UL29solution, 10% in BBP was, during 2 hours at 80° C., | 5 g | |
| (4) | converted to Polymer A melting temperature 58° C. | 4684 g | (1 Equiv.) |

Component 2
Suspension of a solid, desactivated isocyanate:

| (5) | Benzylbutylphthalate | 341.4 g | |
|---|---|---|---|
| (6) | Laromin C 260 were mixed and | 8.6 g | (0.072 Equiv.) |
| (7) | Desmodur TT was introduced and homogenously distributed. | 200.0 g | (1.15 Equiv.) |
| (8) | suspension of the solid isocyanate B | 550.0 g | (1.078 Equiv.) |

Both the components were metered in a two component mixing unit at a mixing ratio of 100 parts/component A to 12 parts/component B by means of heated gear pumps at a temperature of 65° C. and fed in separate, heated piping to a thermally insulated static spiral element mixer from Mixpac AG, Rotkreuz, (Switzerland), which was equipped with 16 elements opposed arranged within one tube. (Inside tube diamater 13 mm, length of one element 13 mm).

The continuously mixed hotmelt was extruded through a slotted die onto a steel conveyor belt at a layer thickness of 3 mm, separated from the band after passing through a cooling section and reduced to centimenter sized pieces. After complete cooling, the pieces were ground in a powder grinder, cooled by dry ice. Grain sizes above 500µ were recycled through the grinder. The powder possessed a melting point of 56° C., the activation temperature was determined as being 98° C.

Example 3

A hydroxy functional prepolymer was manufactured as follows:

| (1) | Capa 240 | 4500 g | (2.25 Eguiv.) |
|---|---|---|---|
| (2) | Isonate 143 | 179 g | (1.25 Equiv.) |
| (3) | UL29solution, 10% in BBP was, during 2 hours at 80° C., | 5 g | |
| (4) | converted to Polymer A | 4684 g | (1 Equiv.) |

Suspension of a solid, desactivated isocyanate.

| (5) | Capa 231 | 500 g | (0.33 Equiv.) and |
|---|---|---|---|
| (6) | Laromin C 260 were mixed at 65° C. and | 8 g | (0.067 Equiv.) |
| (7) | Desmodur TT was introduced and homogenously distributed. | 260 g | (1.49 Equiv.) |
| (8) | suspension of the solid isocyanate B melting temperature above 50° C. | 768 g | (1.097 Equiv.), |

The hydroxy functional prepolymer was applied to a nonstick steel belt at 70° C., in 8 layers of 100µ or 106 g/m2, total 800µ or 848 g/m2, using heated doctor blades at a temperature of 70° C. The liquid surfaces of the individual polymer layers were in each case immediately layered over with 7 layers of 18,7µ or 19,86 g/m2 of suspension 8, total quantity 139 g/m2. The layers of the suspension were applied from 7 application heads, likewise comprising doctor blades heated to 70° C. The uppermost layer was not coated with the suspension.

At the end of the belt the "multilayer" was separated from the belt after passing through a cooling section and reduced to centimeter sized pieces. After complete cooling the pieces were ground in a powder grinder, cooled by dry ice. Grain sizes above 500µ were recycled through the grinder.

For experiments with powder coating on fabrics, a grain size range of 80 to 300µ was used with the powder examples 2 and 3. The powders were scattered with a coating weight of approximately 30 g/m2 onto a cotton fabric. The powders were sintered onto the surface of the fabric in a hot air oven at 140° C. for a duration of 90 seconds. These coated fabrics can be stored at room temperature for at least 4 weeks.

The fabrics coated with powder were laminated with untreated fabric at a temperature of 170° C. for 20 seconds in a press with a pressure of 2 bar, and then further treated at 160° C. for 3 minutes in an air circulation oven.

After 7 days, the samples were washed in boiling water for one hour, dried, and the resistance to peeling was determined:

| Sample size according to DIN 54310 | Peel strength in g per 2.5 cm | | |
|---|---|---|---|
| | before/after boiling | | after dry cleaning |
| Powder according to Example 2 | 1170 | 910 | 1157 |
| Powder according to example 3 | 950 | 810 | 835 |

The experiments demonstrated that a thermostable crosslink took place: the reactive powder, with a melting point of 56° C., was transformed into a thermoset, chemically stable polyurethane after the activation temperature was exceeded.

Inasmuch as the invention is subject to modifications and variations, the foregoing description and accompanying drawings should not be regarded as limiting the invention, which is defined by the following claims and various combinations thereof:

I claim as my invention:

1. A method of manufacturing a room-temperature shelf-stable mixture of reactive substances comprising (A) at least one thermoplastic polymer having a melting point above 40° C., so that it is solid at room temperature, and which carries functional groups reactive with isocyanate, (B) at least one solid polyisocyanate in powder form, suspended in the solid thermoplastic polymer and having a melting point higher than that of the thermoplastic polymer, (C) at least one deactivating agent for reacting with surface isocyanate groups in the solid polyisocyanate, wherein the polyisocyanate is pre-mixed with said deactivating agent, and is thereby deactivated, the pre-mix of polyisocyanate and deactivating agent is then, at a temperature above the melting point of the polymer but below the melting point of the deactivated polyisocyanate, mixed with the polymer, which has been made liquid through warming, in layers, so that the resulting mixture includes first layers which predominantly comprise said polymer, and, between said first layers, second layers which predominantly comprise said deactivated polyisocyanate and also unbound deactivating agent, and the mixture is then cooled and solidified with the said layer structure.

2. The method of claim 1, which the polyisocyanate is pre-mixed with a deactivating agent which is different from the unbound deactivating agent.

3. The method of claim 2, wherein the bound deactivating agent is a high molecular weight amine with a molecular weight above 450 and the unbound deactivating agent is an amine with a molecular weight below 450.

4. The method of claim 1, wherein a primary or secondary amine is used as the deactivating agent.

5. The method of claim 1, wherein the deactivating agent reacts with the surface of the polyisocyanate particles, and unbound deactivating agent is added to the deactivated polyisocyanate.

6. The method of claim 1, in which said pre-mix and said liquefied polymer are applied onto a carrier material in layers and are solidified by cooling on said carrier material.

7. A room-temperature shelf-stable mixture of reactive substances, comprising (A) at least one thermoplastic polymer having a melting point above 40° C., so that it is solid at room temperature, and which carries functional groups reactive with isocyanate, (B) at least one solid polyisocyanate in powder form, suspended in the solid thermoplastic polymer and having a melting point higher than that of the thermoplastic polymer, (C) at least one deactivating agent for reacting with surface isocyanate groups in the solid polyisocyanate, said mixture including first layers which predominantly comprise said polymer, and, between said first layers, second layers which predominantly comprise said polyisocyanate and said deactivating agent, wherein a first part of the deactivating agent is bound to the surface of the isocyanate particles and a second part of the deactivating agent is unbound in the mixture.

8. The mixture of claim 7, comprising 0.1% to 25% isocyanate groups bound to the deactivating agent, wherein the unbound deactivating agent and the bound deactivating agent are present in a ratio between 0.1 and 10.

9. The mixture of claim 7, wherein the bound deactivating agent is different from the unbound deactivating agent.

10. The mixture of claim 9, wherein the bound deactivating agent is a high molecular weight amine with a molecular weight above 450 and the unbound deactivating agent is an amine with a molecular weight below 450.

11. The mixture of claim 9, wherein the thickness of said layers corresponds substantially to the particle size of the polyisocyanate powder.

12. The mixture of claim 11, wherein the thickness of said layers does not exceed the maximum particle size of the polyisocyanate powder.

13. The mixture of claim 7, wherein the deactivating agent is a primary or secondary amine.

14. The mixture of claim 7, wherein the ratio of thermoplastic polymer to isocyanate and deactivating agent in said first layers is at least 10% greater than their average ratio throughout the mixture.

15. A bonding material comprising a mixture according to claim 7, said mixture of substances being heat cured at a temperature above the melting point of the thermoplastic polymer and above the melting point of the solid polyisocyanate.

* * * * *